(12) United States Patent
Sethi et al.

(10) Patent No.: US 12,099,478 B2
(45) Date of Patent: Sep. 24, 2024

(54) METHOD AND SYSTEM FOR PROACTIVELY MANAGING HORIZONTAL SCALING OF A NODE

(71) Applicant: Dell Products L.P., Round Rock, TX (US)

(72) Inventors: Parminder Singh Sethi, Ludhiana (IN); Atishay Jain, Meerut (IN); Shelesh Chopra, Bangalore (IN); Malathi Ramakrishnan, Madurai (IN)

(73) Assignee: Dell Products, L.P., Round Rock, TX (US)

( * ) Notice: Subject to any disclaimer, the term of this patent is extended or adjusted under 35 U.S.C. 154(b) by 96 days.

(21) Appl. No.: 18/082,703

(22) Filed: Dec. 16, 2022

(65) Prior Publication Data
US 2024/0202165 A1     Jun. 20, 2024

(51) Int. Cl.
*G06F 16/182*     (2019.01)

(52) U.S. Cl.
CPC ................. *G06F 16/1844* (2019.01)

(58) Field of Classification Search
None
See application file for complete search history.

(56) References Cited

U.S. PATENT DOCUMENTS

| | | | |
|---|---|---|---|
| 2020/0226144 A1* | 7/2020 | Chen | G06N 20/10 |
| 2021/0192366 A1* | 6/2021 | Kadambi | G06N 5/022 |
| 2021/0374013 A1* | 12/2021 | Prasad | G06F 11/1461 |
| 2021/0397495 A1* | 12/2021 | Prakash | G06F 11/008 |
| 2023/0281219 A1* | 9/2023 | Lee | G06F 16/2282 707/637 |
| 2023/0289325 A1* | 9/2023 | Kurian | G06F 16/215 |

* cited by examiner

*Primary Examiner* — Giuseppi Giuliani
(74) *Attorney, Agent, or Firm* — Chamberlain, Hrdlicka, White, Williams & Aughtry; Aly Z. Dossa (57) ABSTRACT

A method for managing data replication includes: identifying data being used by an application programming interface (API), in which the data is stored in a source device; tagging the data based on a usage level of the data by the API; obtaining a predicted probability of the usage level of the data; making a first determination that the data is tagged as important data and the predicted probability of the usage level of the data is low; and replicating, based on the first determination, the data from the source device to a target device.

20 Claims, 5 Drawing Sheets

| USAGE LEVEL OF APPLICATION DATA (App. Data) | TAG | PREDICTED PROBABILITY OF USAGE LEVEL | REPLICATE? |
|---|---|---|---|
| Usage of App. Data A: 55 times in 1 hour | Important | Low | Yes |
| Usage of App. Data B: 80 times in 1 hour | Highly Important | Low | Yes |
| Usage of App. Data C: 10 times in 1 hour | Least Important | High | No |
| Usage of App. Data D: 30 times in 1 hour | Less Important | High | No |

FIG. 4.2

| USAGE LEVEL OF APPLICATION DATA (App. Data) | TAG | PREDICTED PROBABILITY OF USAGE LEVEL | REPLICATE? |
|---|---|---|---|
| Usage of App. Data A: 55 times in 1 hour | Important | High | No |
| Usage of App. Data B: 80 times in 1 hour | Highly Important | High | No |
| Usage of App. Data C: 10 times in 1 hour | Least Important | Low | Yes |
| Usage of App. Data D: 30 times in 1 hour | Less Important | Low | Yes |

FIG. 5

METHOD AND SYSTEM FOR PROACTIVELY MANAGING HORIZONTAL SCALING OF A NODE

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1 and 4.2 show example use cases in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, in an enterprise environment, when a service (e.g., a web-based service, a desktop-based service, etc.) is executing on a node (e.g., an endpoint) with stateful representational state transfer application programming interfaces (stateful REST APIs), the APIs of the same application(s) may then be referred as "interdependent" (e.g., dependent on each other). In such an environment, if there is a need for horizontal scaling in production workloads (e.g., reading data from a table, writing data to the table, etc.), a second node (e.g., a new node, a target node, etc.) may be added and data (e.g., application data) available on the node (e.g., the existing node, the source node, etc.) may be replicated to the new node. For purposes of this disclosure, a "new node" corresponds to a different node than the one that is currently being used.

In most cases, when data is replicated from a stateful node (e.g., the existing node) (which executes one or more stateful applications) to a new node, the data is replicated as is (e.g., as a blind carbon copy) without keeping the context of REST APIs and without knowing the real context of underlying data. Typically, the data would be replicated in a random order (e.g., without following any replication strategy) and without considering the usability of the data and/or the ongoing activities on the existing node. Because of that, (i) the service on the new node (and the new node itself) will not be completely stateful until all of the data is replicated to the new node (because the APIs on the new node are still waiting for data that are yet to be replicated), in which the replication process may take hours (depending on the size of the data), and (ii) an administrator of the existing node may experience performance degradation in the production workloads.

Embodiments of the invention relate to methods and systems to proactively manage horizontal scaling of an application in a stateful environment. More specifically, the embodiments of the invention infer the context of an ongoing state-fullness of a source node and then enable replication of data from the source node to a target node by considering the usability of the data and/or the ongoing activities on the source node. First, data being used by a REST API in the source node may be identified. The data may then be tagged based on a usage level of the data by the REST API. Thereafter, a predicted probability of the usage level of the data may be obtained. A first determination may then be made that the data is tagged as important (e.g., critical) data and predicted probability of the usage level of the data is low. Based on the first determination, the data may be replicated from the source node to the target node.

Further, second data being used by a second REST API in the source node may be identified. The second data may then be tagged based on a usage level of the second data by the second REST API. Thereafter, a predicted probability of the usage level of the second data may be obtained. A second determination may then be made that the second data is tagged as important data and predicted probability of the usage level of the second data is high. Finally, based on the second determination, the second data may be retained in the source node. As a result of the processes discussed below, one or more embodiments disclosed herein advantageously ensure that within a short period of time (e.g., within a couple of minutes), the target node will be ready to operate for customers (e.g., users) and the service on the target node (and the target node itself) will be completely stateful.

The following describes various embodiments of the invention.

Figure 1:
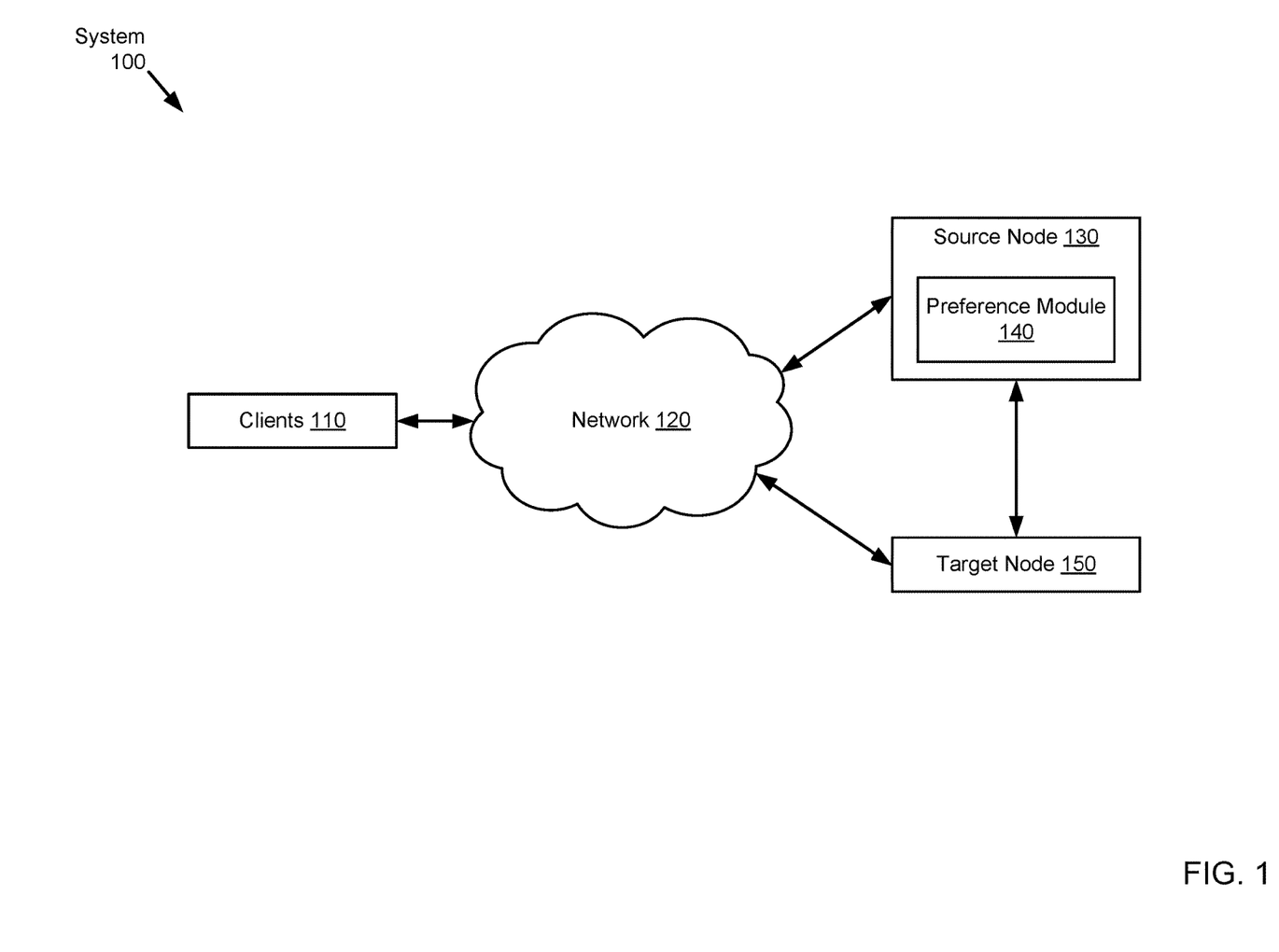
FIG. 1 shows a diagram of a system in accordance with one or more embodiments of the invention.

FIG. 1 shows a diagram of a system (100) in accordance with one or more embodiments of the invention. The system (100) includes any number of clients (110), a network (120), a source node (130), and a target node (150). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the source node (130), the clients (110), and the target node (150) may be physical or logical devices, as discussed below. In one or more embodiments, the system (100) may include any number of source nodes and any number of target nodes without departing from the scope of the invention. In one or more embodiments, the source nodes may collectively be referred to as "a source environment". Similarly, in one or more embodiments, the target nodes may collectively be referred to as "a target environment".

While FIG. 1 shows a specific configuration of the system (100), other configurations may be used without departing from the scope of the invention. For example, although the clients (110) and the nodes (the source node (130), the target node (150)) are shown to be operatively connected through the network (120), the clients (110) and the nodes (130, 150) may be directly connected, without an intervening network (e.g., 120). As yet another example, although the source node (130) and the target node (150) are shown to be directly connected, the source node (130) and the target node (150) may be executing on the same environment (e.g., a production host environment).

Further, the functioning of the clients (110) and the nodes (130, 150) is not dependent upon the functioning and/or existence of the other device(s) in the system (100). Rather, the clients (110) and the nodes (130, 150) may function independently, and perform operations locally that do not require communication with other devices. Accordingly, embodiments disclosed herein should not be limited to the configuration of devices and/or components shown in FIG. 1.

In one or more embodiments, the system (100) may deliver computing power and storage capacity as a service to users of the clients (110) via the network (120). The system (100) may also represent a comprehensive middleware layer running on computing devices (e.g., 500, FIG. 5) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the environments (e.g., 130, 150). Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, as being a physical computing device or a logical computing device (e.g., a VM), the source node (130) may be configured for hosting and maintaining various workloads, or for providing a computing environment (e.g., computing power and storage) whereon workloads may be implemented. The source node (130) may also exchange data with other nodes (e.g., other source nodes, target nodes, etc.) registered in/to the network (120) in order to, for example, participate in a collaborative workload placement. For example, the source node (130) may split up a request (e.g., an operation, a task, an activity, etc.) with another source node, coordinating its efforts to complete the request (e.g., to generate a response) more efficiently than if the source node (130) had been responsible for completing the request.

One of ordinary skill will appreciate that the source node (130) may perform other functionalities without departing from the scope of the invention. Examples of the source node (130) may include (but not limited to): an enterprise server, a modular server, a blade server, a mainframe, a workstation computer, etc. In one or more embodiments, the source node (130) may be a heterogeneous set, including different types of hardware components and/or different types of operating systems (OSs).

In one or more embodiments, a workload (not shown) may refer to a physical or logical component configured to perform certain work functions. Workloads may be instantiated (e.g., initiated, executed, etc.) and may be operated while consuming computing resources allocated thereto. Examples of a workload may include (but not limited to): a VM, a container, a database, an application, a collection of microservices, etc.

As used herein, a "server" may provide computer-implemented services (e.g., receiving a request, sending a response to the request, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 500, FIG. 5) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

In one or more embodiments, as being a stateful environment with stateful REST APIs (where the APIs of the same application(s) are interdependent), the source node (130) may include any number of applications (and/or content accessible through the applications) that provide stateful, computer-implemented application services to a user. Applications may be designed and configured to perform one or more operations (e.g., functions, tasks, activities, etc.) instantiated by a user of the source node (130). Examples of an application may include (but not limited to): a word processor, a media player, a web browser, a file viewer, an image editor, etc.

In one or more embodiments, application services may include, for example (but not limited to): database services, electronic communication services, instant messaging services, file storage services, web-based services, desktop-based services, a workload placement collaboration, serving (e.g., processing) a request, sharing an application log, receiving computing resource details of a node, transmitting a request, analyzing data, streaming video, etc.

In order to provide the above-mentioned application services, each application may host similar or different components. The components may be, for example (but not limited to): instances of databases, instances of email servers, etc. Applications may be executed on one or more clients as instances of the applications.

In one or more embodiments, applications may vary in different embodiments, but in certain embodiments, applications may be custom developed or commercial (e.g., off-the-shelf) applications that a user desires to execute in the source node (130). In one or more embodiments, applications may be logical entities executed using computing resources of the source node (130). For example, applications may be implemented as computer instructions, e.g., computer code, stored in persistent storage that when executed by a processor(s) of a computing device (e.g., 500, FIG. 5) cause the computing device to provide the functionality of the applications described throughout this application.

In one or more embodiments, while performing, for example, one or more operations requested by a user, applications installed on the source node (130) may include functionality to request and use physical and logical components (discussed below) of the source node (130). The applications may perform other types of functionalities not listed above without departing from the scope of the invention. In one or more embodiments, while providing application services to a user, applications may store data that may be relevant to the user in storage/memory resources (discussed below) of the source node (130).

In one or more embodiments, in order to provide the above-mentioned application services to a user, applications may need to communicate with one another with a minimum amount of latency. For this reason, in most cases, RESTful APIs (also referred to herein as "REST APIs") are used for communications between applications. As used herein, a "REST API" is an interface that two computing devices use to exchange data securely over the Internet. More specifically, the term "REST" defines a set of rules and constraints (not a protocol or a standard) that need to be followed when building the services. Any application that adheres to those rules and constraints will be able to communicate via a set of uniform, shared, and stateless (or stateful) operators and requests. APIs denote the underlying code that, if it conforms to the set of rules and constraints, allows the applications to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate an application's connection (e.g., access) to one another. In general, the application performing the accessing is called "the client", and the application containing a resource is called "the server".

In operation, REST APIs use Hypertext Transfer Protocol (HTTP) to communicate. More specifically, REST APIs communicate via HTTP to perform standard database functions such as creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that applications (e.g., services) making requests via REST APIs must be designed to expect an immediate response. If the client receiving the response is down, the sending service may be blocked while it awaits for the response. To prevent this, failover and error handling logic may be applied to (e.g., built into) both applications.

In one or more embodiments, there may be four HTTP requests (e.g., methods): (i) "get" requests, (ii) "post" requests, (iii) "put" requests, and (iv) "delete" requests. In one or more embodiments, users may use "get" requests to access resources that are located at a specified uniform resource locator (URL) on a server. They may cache "get" requests and send parameters in a REST API request to instruct the server to filter data before sending. Users may use "post" requests to send data to the server, in which sending the same "post" request multiple times may have a side effect of creating the same resource multiple times.

Further, users may use "put" requests to update existing resources on the server. Unlike "post", sending the same "put" request multiple times in a RESTful web service may give the same result. Users may also use "delete" requests to remove the resource. A "delete" request may change the server state; however, if a user does not have appropriate authentication, the "delete" request may fail.

In one or more embodiments, in order to facilitate the communication between applications, two types of REST APIs (e.g., stateless REST APIs and stateful REST APIs) may be used. As used herein, a "state" of a REST API (or an application, for example) specifies its condition or quality of being at a given point in time. In most cases, whether a REST API is stateful or stateless depends on how long the state of interaction with it is being recorded and how that information needs to be stored.

In a REST API architecture, "statelessness" refers to a communication method in which the server completes every user request independently of all previous requests. In this architecture, users may request resources in any order, and every request is stateless or isolated from other requests (e.g., there is no stored knowledge of or reference to past transactions and each request is separate and unconnected). This REST API design constraint implies that servers may completely understand and fulfill each request every time (e.g., each request needs to include all the information necessary to initiate processing). Said another way, stateless REST APIs do not require any server-side sessions and applications are not allowed to store any data related to the requests.

In most cases, stateless applications may provide one service (or function) and use content delivery network, web, or print servers to process these "short-term" requests. An example of a stateless transaction may be an online search operation performed by a user. The user may type a question into a search engine and then hit enter. If this operation is interrupted or ended accidentally, the user may need to start a new operation. This indicates that (i) these two API calls are not dependent on each other and (ii) the result of the first API call not need to be considered to make the second API call.

Further, in the REST API architecture, "statefulness" refers to a communication method in which a current request may be affected by the context of previous requests (e.g., by what happened during previous transactions). This REST API design constraint implies that stateful applications (and processes) may be executed based on the context of previous transactions. For this reason, stateful applications may use the same servers each time they process a request(s) from a user (e.g., a second API call may take a state from a result of a first API call). In this manner, when a stateful transaction is interrupted, the user may continue (more or less) from the point where the user left off because the context and history (e.g., a window location, a setting preference, a recent activity, etc.) have already been stored.

In one or more embodiments, in order to provide computer-implemented services, the source node (130) may include a collection of physical components (e.g., processing resources, storage/memory resources, networking resources, etc.) configured to perform operations of the source node (130) and/or otherwise execute a collection of logical components (e.g., applications, virtualization resources, etc.) of the source node (130).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuitry that may execute operations specified by an application. A CPU may perform an operation based on the following three steps: (i) fetching instructions related to an operation from the storage/memory resources, (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to): a graphics memory controller, a video processing engine, a graphics and computation engine, etc.

As used herein, a "DPU" may refer to an electronic circuitry that may perform accelerated data processing and optimized data movement data within each node. In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data (e.g., application data) in each node. Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in each node. The data stored may be accessed almost instantly (e.g., in milliseconds (ms)) regardless of where the data is stored in memory. The memory may provide the above-mentioned instant data access because the memory may be directly connected to a CPU on a wide and fast bus (e.g., a high-speed internal connection that transfers data among hardware components of the node).

In one or more embodiments, application data may include, for example (but not limited to): a list of instructions, one or more application logs, etc. In one or more embodiments, application logs may include, for example (but not limited to): a setting of an application, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In one or more embodiments, the source node (130) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, while applications provide computer-implemented services to the clients (110), the applications may store data that may be relevant to the clients (110) to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., service level agreements) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, each application may include a virtual address space. A virtual address space may be a simulated range of addresses (e.g., identifiable locations) that mimics physical locations of one or more physical components of the source node (130). In most cases, an application is not configured to identify the physical locations of the components; rather, the application relies on other components of the source node (130) to translate one or more virtual addresses of the virtual address space to one or more physical addresses of the physical components. Accordingly, in one or more embodiments, an application may utilize a virtual address space to read, write, and/or otherwise manipulate data, without being configured to directly identify the physical address of that data within the physical components of the source node (130).

Further, each application may communicate with other components of the source node (130) to establish a mapping between a virtual address space and the physical components of the source node (130). In one or more embodiments, when a mapping is established, an application's use of the virtual address space enables the application to directly manipulate data in the physical components, without relying on other components of the source node (130) to repeatedly update mappings between the virtual address space and the physical addresses of the physical components of the source node (130).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface the source node (130) with external entities (e.g., the target node (150), the clients (110), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the source node (130) and the external entities. For example, a networking resource may enable the source node (130) to be operatively connected, via Ethernet, using a TCP protocol to form a "network fabric", and may enable the communication of data between the source node (130) and the external entities. In one or more embodiments, the source node (130) may be given a unique identifier (e.g., an Internet Protocol (IP) address) to be used when utilizing the above-mentioned protocols.

Further, a networking resource, when using a certain protocol or a variant thereof, may support streamlined access to storage/memory media of other nodes. For example, when utilizing remote direct memory access (RDMA) to access data on another node, it may not be necessary to interact with the logical components of that node. Rather, when using RDMA, it may be possible for the networking resource to interact with the physical components of that node to retrieve and/or transmit data, thereby avoiding any higher-level processing by the logical components executing on that node.

In one or more embodiments, a virtualization resource (not shown) may refer to a measurable quantity of a virtualization-relevant resource type (e.g., a virtual hardware component), which can be requested, allocated, and consumed, as a replacement for a physical hardware component.

A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the source node (130). The VM (and applications hosted by the VM) may generate data (e.g., VM data) that is stored in the storage/memory resources of the source node (130), in which the VM data may reflect a state of the VM. In one or more embodiments, the VM may provide services to clients (110), and may host instances of databases, email servers, or other applications that are accessible to the clients (110).

In one or more embodiments, a virtualization resource may include a hypervisor, in which the hypervisor may be configured to orchestrate an operation of a VM by allocating computing resources of the source node (130) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the source node (130) that when executed by processing resources of the source node (130) cause the source node (130) to provide the functionality of the hypervisor.

In one or more embodiment, the source node (130) may further include a preference module (140), which may be coupled (e.g., interacting) with at least one stateful application service executing on the source node (130). In one or more embodiments, the preference module (140) may be separate from and connected to both nodes (130, 150). The preference module (140) may be implemented using hardware, software, or any combination thereof. The preference module (140) may be configured to perform all, or a portion, of the functionality described in FIG. 3. Additional details about the preference module are described below in reference to FIG. 2.

Figure 5:
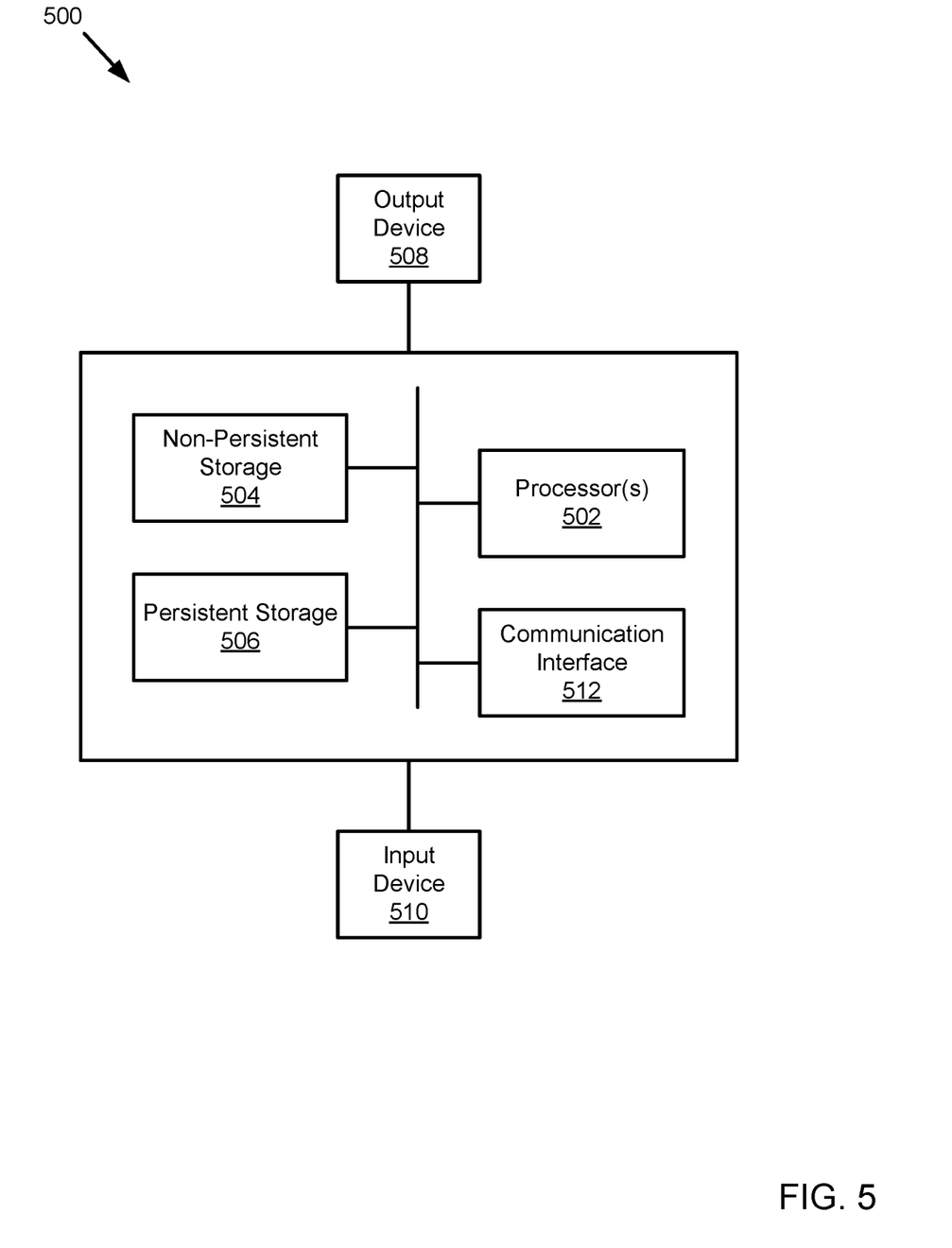
FIG. 5 shows a diagram of a computing device in accordance with one or more embodiments of the invention.

In one or more embodiments, the source node (130) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the source node (130) described throughout this application.

Alternatively, in one or more embodiments, the source node (130) may be implemented as a logical device. The logical device may utilize the computing resources of any number of computing devices to provide the functionality of the source node (130) described throughout this application.

In one or more embodiments, an administrator of an existing node (e.g., the source node (130)) may need to increase the quantity of nodes in the system (100) to horizontally scale the existing node. For example, the administrator (e.g., a user with permission to make changes on nodes that will affect other users of those nodes) may need to increase the quantity of nodes when there is a surge in network traffic (e.g., when there is an unusually high amount of activity in the network traffic) due to a recently launched mobile phone. To minimize side effects (e.g., latency in the network, increased average response time, etc.) of the surge, the administrator may add the target node (150) to the system.

As used herein, "network traffic" is an amount of data moving across a network (e.g., 120) at any given time. For example, in search engine optimization, network traffic may be characterized as being either direct, organic, or paid, in which (i) direct network traffic may be initiated when a user types a website's URL in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, a network traffic may be characterized as either being north-south or east-west, in which (i) north-south network traffic may be client-to-server network traffic that operates between a client and a server and (ii) east-west network traffic may be server-to-server network traffic that operates between servers within a data center.

In one or more embodiments, similar to the source node (130), the target node (150) may also, for example (but not limited to): be configured for hosting and maintaining various workloads, be configured for providing a computing environment whereon workloads may be implemented, participate in a collaborative workload placement, be an enterprise server, be a modular server, include physical and logical components, include different types of OSs, include any number of applications, etc.

In one or more embodiments, the target node (150) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the target node (150) described throughout this application.

Alternatively, in one or more embodiments, similar to the source node (130), the target node (150) may also be implemented as a logical device.

In one or more embodiments, the clients (110) may provide computer-implemented services to users of the clients (110) (and/or other computing devices such as, other clients or other types of devices). The clients (110) may provide any number and any type of computer-implemented services (e.g., data storage services, electronic communication services, etc.). The clients (110) may be physical or logical devices, as discussed below.

To provide computer-implemented services, entities hosted by the clients (110) may utilize data from any number of resources. For example, the clients (110) may utilize data stored in storage/memory resources of the source node (130). The clients (110) may also utilize data from other resources without departing from the invention.

In one or more embodiments, the clients (110) may issue requests to the source node (130) to (i) receive responses and (ii) interact with various components of the source node (130) (described above). The clients (110) may also request data from and/or send data to the source node (130). Further, the clients (110) may initiate an application to execute on the source node (130) such that the application may (itself) gather, transmit, and/or otherwise manipulate data located on the source node (130), remote to the clients (110). In one or more embodiments, the clients (110) may share access to more than one node and may similarly share any data located on those nodes.

In one or more embodiments, the clients (110) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout this application.

Alternatively, in one or more embodiments, similar to the source node (130), the clients (110) may also be implemented as logical devices.

In one or more embodiments, users may interact with (or operate) the clients (110) in order to perform work-related tasks (e.g., production workloads). In one or more embodiments, the accessibility of users to the clients (110) may depend on a regulation set by the administrators. To this end, each user may have a personalized user account that may, for example, grant access to certain data, applications, and computing resources of the clients (110). This may be realized by implementing a "virtualization" technology. Virtualization allows for the generation of a VM that behaves as if it were a physical computing device with its own hardware components. When properly implemented, VMs on the same host (e.g., the client) are sandboxed from one another so that they do not interact with each other, and the data, applications, and computing resources from one VM are not visible to another VM even though they are on the same physical host.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (120) may represent a computing network configured for computing resource and/or messages exchange among registered computing hosts (i.e., the nodes (130, 150), the clients (110), etc.). As discussed above, components of the system (100) may operatively connect to one another through the network (120) (e.g., a local area network (LAN), a wide area network (WAN), a mobile network, a wireless LAN (WLAN), etc.). In one or more embodiments, the network (120) may be implemented using any combination of wired and/or wireless connections. Further, the network (120) may enable interactions between the nodes (130, 150) and the clients (110) through any combination of wired and/or wireless network protocols (e.g., TCP, UDP, Internet Protocol version 4 (IPv4), etc.).

The network (120) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more nodes (e.g., 130, 150, etc.) in the network (120), and (iii) limiting communication(s) on a granular level (e.g., on a per-port level, on a per-sending device level, etc.).

In one or more embodiments, before communicating data over the network (120), the data may first be broken into smaller batches (e.g., data packets) so that larger size data can be communicated efficiently. For this reason, the network-enabled subcomponents may break data into data packets. The network-enabled subcomponents may then route each data packet in the network (120) to distribute the network traffic uniformly.

In one or more embodiments, the network-enabled subcomponents may decide how real-time (e.g., on the order of ms or less) network traffic and non-real-time network traffic should be managed in the network (120). In one or more embodiments, the real-time network traffic may be high priority (e.g., urgent, immediate, etc.) network traffic. For this reason, data packets of the real-time network traffic may need to be prioritized in the network (120). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (120). The non-real-time network traffic may include data packets related to, for example (but not limited to): File Transfer Protocol (FTP) for web publishing, email applications, etc.

Figure 2:
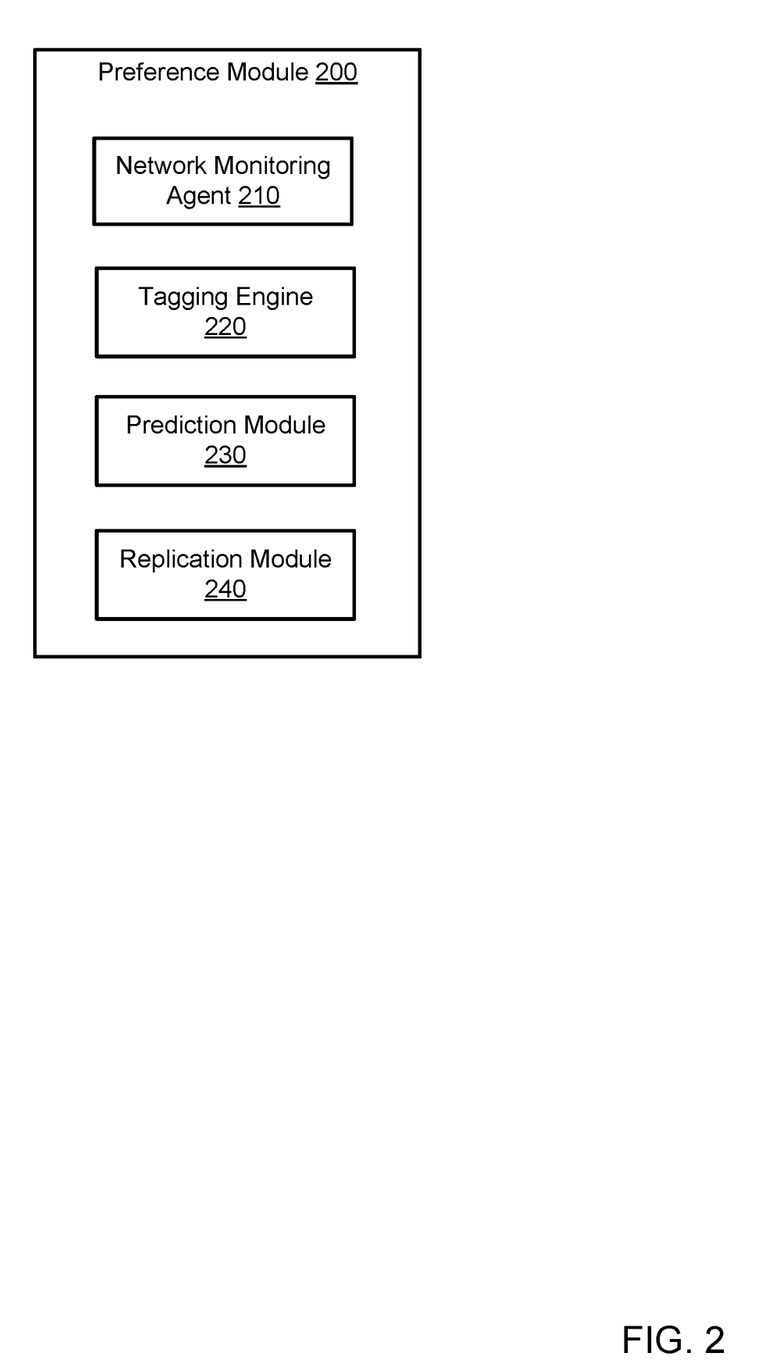
FIG. 2 shows a diagram of a preference module in accordance with one or more embodiments of the invention.

Turning now to FIG. 2, FIG. 2 shows a diagram of a preference module (200) in accordance with one or more embodiments of the invention. The preference module (200) may be an example of the preference module discussed above in reference to FIG. 1. The preference module (200) may include a network monitoring agent (210), a tagging engine (220), a prediction module (230), and a replication module (240). The preference module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the network monitoring agent (210) may include functionality to monitor (e.g., track) network traffic in the network (e.g., 120, FIG. 1) to obtain a dataset. In one or more embodiments, the dataset may include, for example (but not limited to): a request (e.g., a REST API call), a type of a request (e.g., a "get" request, a "delete" request, an "update" request, a "post" request, etc.), a response to a request (e.g., a response to a REST API call), corresponding response time for a request, a list of application data (e.g., a list of underlying resources) that is being used (e.g., obtained, updated, etc.) by a REST API (e.g., application data 1 and 2 are being used by REST API X to change locations of both data in the file system), a list of operations that is being done on application data (e.g., while renaming application data 2, REST API X encrypted application data 2; after encrypting, REST API X duplicated and modified application data 2), a usage level (e.g., 20 times in 1 hour, 10 times in 1 minute, etc.) of an application data by a REST API, a period of time within which application data is being used by a REST API, etc.

In one or more embodiments, a request and response to that request may be communicated over the network (e.g., 120, FIG. 1). In one or more embodiments, corresponding response time for a request may be a period of time, with a definite start and end, within which a response process is set to be completed.

In one or more embodiments, the network monitoring agent (210) may periodically obtain the dataset from the network traffic. The network monitoring agent (210) may also obtain the dataset from the network traffic in real-time. The network monitoring agent (210) may then store (temporarily or permanently) the dataset in the storage/memory resources (discussed above) of the source node (e.g., 130, FIG. 1).

In one or more embodiments, the network monitoring agent (210) may also monitor (by its firewall) the network traffic to determine, for example (but not limited to): availability of the network, unusual activities on the network, etc. In most cases, an unusual activity on the network (e.g., 120, FIG. 1) may be a sign of a security issue (e.g., a malicious attack). Because of the determined unusual activity, the network monitoring agent (210) may notify an administrator (e.g., a network service provider (NSP)) of the network (e.g., 120, FIG. 1). Based on receiving the notification from the network monitoring agent (210), the NSP of the network may reconfigure the network to fix the security issue.

As used herein, a "firewall" is a network monitoring/security component that monitors incoming and outgoing network traffic, in which it decides whether to allow or block specific traffic based on a defined set of security rules. A firewall may be, for example (but not limited to): a hardware component, a software component, a software as-a-service (SaaS), a private cloud, etc. The aforementioned example is not intended to limit the scope of the invention.

In one or more embodiments, because of increased network traffic, the network monitoring agent (210) may detect latency (e.g., delay) in the network (e.g., 120, FIG. 1). Because of the latency (e.g., 35 ms latency Quality of Service (QOS) network connection), the network monitoring agent (210) may also notify the NSP. Based on receiving the notification from the network monitoring agent (210), the NSP may also reconfigure the network (e.g., 120, FIG. 1) to minimize the latency.

In one or more embodiments, the network monitoring agent (210) may detect latency in the network traffic because of, for example (but not limited to): an increased amount of requests, an increased amount of responses, an increase in a size of a request, an increase in a size of a response, etc.

One of ordinary skill will appreciate that the network monitoring agent (210) may perform other functionalities without departing from the scope of the invention. The network monitoring agent (210) may be implemented using hardware, software, or any combination thereof. Additional details of the network monitoring agent are described below in reference to FIG. 3.

In one or more embodiments, the tagging engine (220) may include functionality to: (i) obtain (or receive) the dataset (as input) from the storage/memory resources of the source node (e.g., 130, FIG. 1) and (ii) based on the dataset (in particular, based on the usage levels of application data), tag application data for its near-future usage level.

In one or more embodiments, the tagging engine (220) may tag application data based on its recent and/or current usage level (e.g., trend) by one or more REST APIs, in which the recent and/or current usage level may indicate this data's near-future usage level by the same REST APIs (until there is a dynamic (e.g., unexpected) change in the usage level due to, for example, a last-minute sale event on an electronic commerce webpage).

In one or more embodiments, the tagging engine (220) may tag application data as, for example (but not limited to): important (e.g., if application data is used 55 times in 1 hour by a REST API), highly important (e.g., if application data is used 80 times in 1 hour by a REST API), least important (e.g., if application data is used 10 times in 1 hour by a REST API), less important (e.g., if application data is used 30 times in 1 hour by a REST API), etc.

In one or more embodiments, in order to tag application data based on its usage level (and other parameters available the dataset), the tagging engine (220) may include one or more configuration instructions. In one or more embodiments, the configuration instructions may specify, for example (but not limited to): a predetermined maximum usage level threshold, a predetermined minimum usage threshold, any usage level (within a predetermined unit of time (e.g., 1 hour, 1 minute, 1 second, etc.)) that is above a predetermined maximum usage level threshold should be tagged as "highly important", any usage level (within a predetermined unit of time) that is below a predetermined minimum usage level threshold should be tagged as "least important", etc.

In one or more embodiments, configuration instructions may be set (and updated) by a manufacturer of the tagging engine (220). Alternatively, configuration instructions may also be set by an administrator or a user of the tagging engine (220).

For example, consider a scenario where application data A is used, by REST API Z, 53 times in 1 hour. In this scenario, the tagging engine (220) may determine that the usage level of application data A is (i) above a predetermined normal usage level threshold (e.g., 40 times in 1 hour) and (ii) below a predetermined maximum usage level threshold (e.g., 70 times in 1 hour). In this manner, based on the configuration instructions, the tagging engine (220) may tag application data A as "important".

As yet another example, consider a scenario where application data B is used, by REST API Z, 77 times in 1 hour. In this scenario, the tagging engine (220) may determine that the usage level of application data B is above the predetermined maximum usage level threshold. In this manner, based on the configuration instructions, the tagging engine (220) may tag application data B as "highly important".

As yet another example, consider a scenario where application data C is used, by REST API Z, 8 times in 1 hour. In this scenario, the tagging engine (220) may determine that the usage level of application data C is below a predetermined minimum usage level threshold (e.g., 15 times in 1 hour). In this manner, based on the configuration instructions, the tagging engine (220) may tag application data C as "least important".

As yet another example, consider a scenario where application data D is used, by REST API Z, 28 times in 1 hour. In this scenario, the tagging engine (220) may determine that the usage level of application data D is (i) above the predetermined minimum usage level threshold and (ii) below the predetermined normal usage level threshold. In this manner, based on the configuration instructions, the tagging engine (220) may tag application data D as "less important".

In one or more embodiments, the tagging engine (220) may then store (temporarily or permanently) the tagging information of each application data in the storage/memory resources of the source node (e.g., 130, FIG. 1).

One of ordinary skill will appreciate that the tagging engine (220) may perform other functionalities without departing from the scope of the invention. The tagging engine (220) may be implemented using hardware, software, or any combination thereof. Additional details of the tagging engine are described below in reference to FIG. 3.

In one or more embodiments, the prediction module (230) may include functionality to: (i) obtain (or receive) the tagging information of each application data (as input) from the storage/memory resources of the source node (e.g., 130, FIG. 1) and (ii) employ a set of linear, non-linear, and/or ML models (e.g., Mondrian Conformal Prediction (MCP) model) to obtain a "predicted" probability of usage level (e.g., high, low, etc.) of each tagged application data to be able to infer whether the tagged application data will be used (e.g., will not be available) or will not be used (e.g., will be available) by the source node (e.g., 130, FIG. 1) in near-future (before, for example, replicating the data to another node).

For example, "important" tagged application data may be replicated from the source node (e.g., 130, FIG. 1) to the target node (e.g., 150, FIG. 1) if the predicted probability of usage level of that data is "low". As yet another example, "least important" (e.g., "not important") tagged application data may be retained (e.g., may not be replicated from) in the source node (e.g., 130, FIG. 1) if the predicted probability of usage level of that data is "high". In this manner, a user or an administrator of the source node (e.g., 130, FIG. 1) may not experience performance degradation in production workloads, because (i) the replication process of application data that will be "in use" in near-future may take hours (depending on the size of the data) and (ii) the replication process may use limited computing resources of the source node (e.g., 130, FIG. 1).

In one or more embodiments, if the tagging process (discussed above) performed by the tagging engine (220) takes time, and because of that, if the dataset that is obtained from the network monitoring agent (210) became stale, the prediction module (230) may directly obtain the latest (e.g., the most recent) dataset from the network monitoring agent (210) in order to obtain an accurate predicted probability of usage level for each tagged application data.

As used herein, "conformal prediction" may refer to predicting a label to a given test observation based on past experiences. In one or more embodiments, the conformal prediction model (e.g., the MCP model), using a nonconformity measure, may produce a prediction region for every probability of error "Σ". In this manner, based on the usage level of tagged data, the MCP model may be used to further confirm and ascertain previously determined usage level of the tagged data.

First, a ratio called "conformity measure" may be determined. "Conformity measure" is a function that assigns a conformity score "∝" to every sample in a dataset (e.g., Table 1). "Conformity score" is what defines how well a sample in the dataset conforms to rest of the dataset. For example, a sample may be identified as non-conforming (or strange) if "∝" of that sample is small.

TABLE 1

| Usage Level of Application Data (App. Data) | Tag | Assigned Value |
| --- | --- | --- |
| App. Data A: 55 times in 1 hour | Important | 2 |
| App. Data B: 80 times in 1 hour | Highly Important | 3 |
| App. Data C: 10 times in 1 hour | Least Important | 0 |
| App. Data D: 30 times in 1 hour | Less Important | 1 |

In Table 1, usage level of each app. data, corresponding tag information of each app. data, and assigned "dummy" values of each app. data are shown, in which "0" being the "least important" and "3" being "highly important". Based on the parameters shown in Table 1, the MCP model determines the conformity score of each sample (e.g., previously determined usage level of each app. data) using:

$$p(y) = \frac{\#\{i = 1, \ldots, n+1 \mid \propto_i^y \le \propto_{i+1}^y\}}{n+1}$$

As well as the following parameters: (i) Y—a set of all possible labels, (ii) $Z_1, \ldots, Z_m$—labelled samples, and (iii) $\propto_1, \ldots, \propto_m$—corresponding conformity scores of the labelled samples. For each possible label $y \in Y$ for x* (test sample), the MCP model computes a "p-value" using the above equation and a training set $Z_1, \ldots, Z_n$, in which $\propto_1^y, \ldots, \propto_n^y, \propto_{n+1}^y$ are the conformity scores corresponding to $Z_1, \ldots, Z_n$, (x*, y).

If a significance level $\in >0$ is given (e.g., the target probability of error), the MCP model may determine the following conformity scores (in Table 2) set using $\Gamma^\in = \{y \in Y \mid p(y) > \in\}$

TABLE 2

| Usage Level of Application Data (App. Data) | Tag | Assigned Value | Conformity Score |
| --- | --- | --- | --- |
| App. Data A: 55 times in 1 hour | Important | 2 | 0.2 |
| App. Data B: 80 times in 1 hour | Highly Important | 3 | 0.54 |
| App. Data C: 10 times in 1 hour | Least Important | 0 | 1.8 |
| App. Data D: 30 times in 1 hour | Less Important | 1 | 1.1 |

From Table 2, based on the conformity scores, whether the tagging information of each app. data is correct or not may be determined. As shown in Table 2, for the first two rows, the MCP model has yielded low conformity scores, indicating App. A and App. B are tagged incorrectly. For this reason, as shown in Table 3, the assigned values of App. A and App. B are changed, and the above-discussed process of finding the conformal prediction is repeated until all the MCP model yields high (and/or similar) conformity scores for each app. data.

TABLE 3

| Usage Level of Application Data (App. Data) | Tag | Assigned Value | Conformity Score | Probability of Usage Level |
|---|---|---|---|---|
| App. Data A: 55 times in 1 hour | Important | 1 | 1.2 | Low |
| App. Data B: 80 times in 1 hour | Highly Important | 2 | 1.54 | High |
| App. Data C: 10 times in 1 hour | Least Important | 0 | 1.8 | Low |
| App. Data D: 30 times in 1 hour | Less Important | 1 | 1.1 | Low |

As shown in Table 3, after obtaining high (and/or similar) conformity scores for each app. data, the MCP model maps the assigned value of each app. data to the appropriate "probability of usage level" such as, for example, "0, 1"→ low and "2"→ high.

In one or more embodiments, the prediction module (230) may then store (temporarily or permanently) the predicted probability of usage level information of each app. data in the storage/memory resources of the source node (e.g., 130, FIG. 1).

One of ordinary skill will appreciate that the prediction module (230) may perform other functionalities without departing from the scope of the invention. The prediction module (230) may be implemented using hardware, software, or any combination thereof. Additional details of the prediction module are described below in reference to FIG. 3.

In one or more embodiments, the replication module (240) may include functionality to: (i), based on the output obtained (or received) from the prediction module (230), replicate the tagged data from the source node (e.g., 130, FIG. 1) to the target node (e.g., 150, FIG. 1) and (ii) based on the output obtained (or received) from the prediction module (230), retain the tagged data in the source node (e.g., 130, FIG. 1).

For example, "highly important" tagged app. data may be replicated from the source node (e.g., 130, FIG. 1) to the target node (e.g., 150, FIG. 1) if the predicted probability of usage level of that data is "low". As yet another example, "important" tagged app. data may be retained in the source node (e.g., 130, FIG. 1) if the predicted probability of usage level of that data is "high".

In one or more embodiments, the replication module (240) may initiate a replication process of the tagged data from the source node (e.g., 130, FIG. 1) to the target node (e.g., 150, FIG. 1) from time to time (e.g., upon request from the prediction module (230) or pursuant to a determination made by the prediction module (230)). In one or more embodiments, the replication module (240) may monitor the status (e.g., a currently active or completed status) of a replication process that is being executed. The status of the replication process may specify information such as: (i) whether the replication process was successful and whether the replication process was completed within a replication window (e.g., 100% of the replication process was completed), or (ii) whether the replication process was unsuccessful and how much of the replication process was not completed within the replication window (e.g., 80% of the replication process was completed and 20% of the replication process was not completed).

In one or more embodiments, the replication window may be a period of time, with a definite start and end, within which a replication process is set to be completed.

In one or more embodiments, the replication module (240) may include a replication monitoring service for monitoring the status of the replication process. The replication monitoring service may represent a computer program that may execute on the underlying hardware of the replication module (240). Specifically, the replication monitoring service may be designed and configured to facilitate a remote access to check the status of and/or to manipulate remotely stored data in the target node (e.g., 150, FIG. 1) during the replication process. Further, the replication monitoring service may include functionality to control remote procedure calls (e.g., API calls) directed to accessing and manipulating any granularity of the remotely stored data during the replication process.

As used herein, an "API call" may refer to a process of an application or a computing device submitting a request to an API to retrieve the requested data from an external application or an external computing device.

In one or more embodiments, when the replication process is completed, the replication module (240) may send a notification (e.g., a completion notification) to a requesting entity (who sent a horizontal scaling request for the source node (e.g., 130, FIG. 1)) regarding the completion of the horizontal scaling. In one or more embodiments, the notification may indicate whether the horizontal scaling was completed within a horizontal scaling window or whether the horizontal scaling was completed after exceeding the horizontal scaling window.

In one or more embodiments, the notification generated by replication module (240) may be displayed on a GUI of the source node (e.g., 130, FIG. 1). The notification may be displayed in any visual format that would allow the requesting entity of the source node (e.g., 130, FIG. 1) to easily comprehend (e.g., read and parse) the listed information.

One of ordinary skill will appreciate that the replication module (240) may perform other functionalities without departing from the scope of the invention. The replication module (240) may be implemented using hardware, software, or any combination thereof. Additional details of the replication module are described below in reference to FIG. 3.

While FIG. 2 shows a specific configuration of the preference module (200), other configurations may be used without departing from the scope of the disclosure. Accordingly, embodiments disclosed herein should not be limited to the configuration of devices and/or components shown in FIG. 2.

Figure 3:
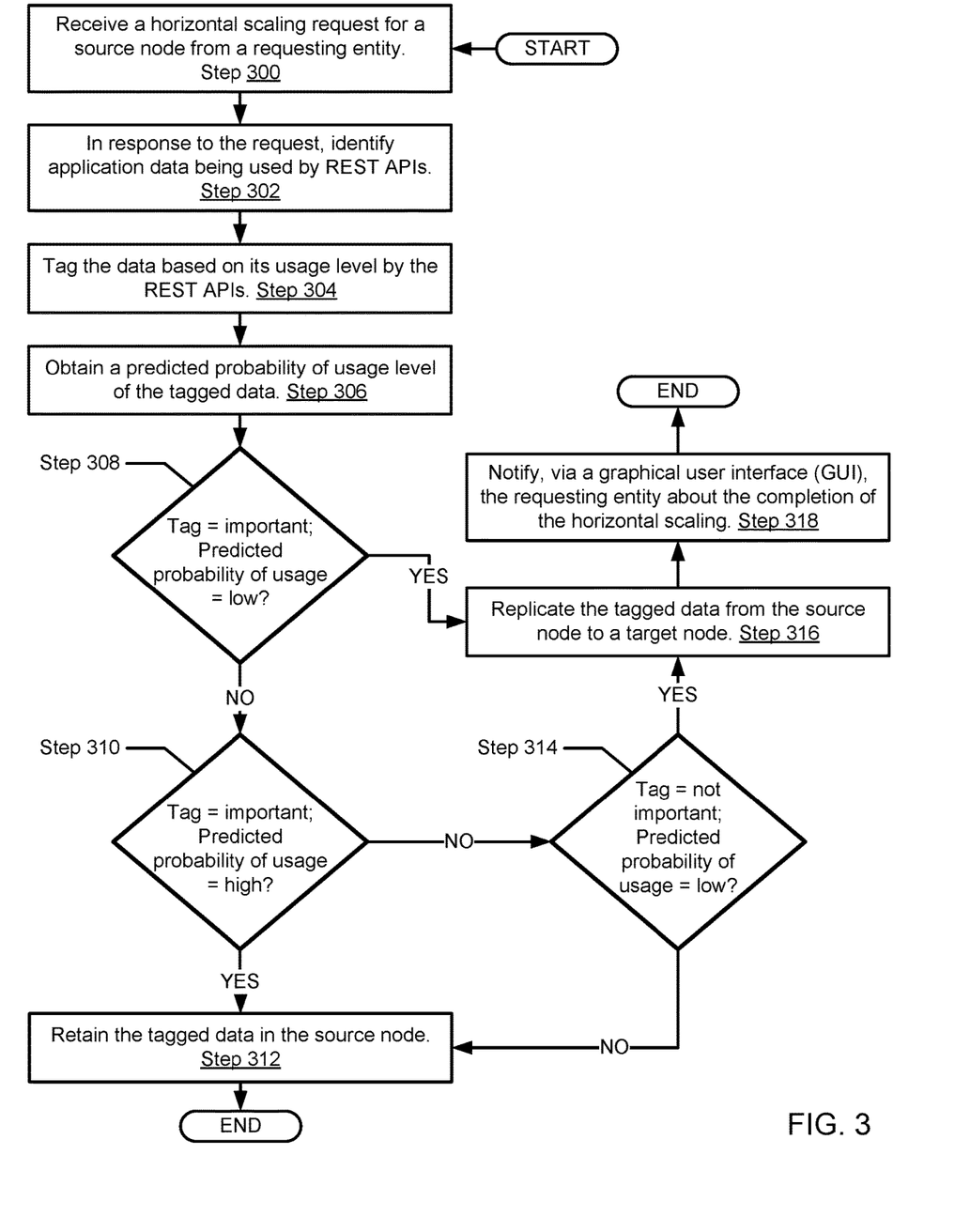
FIG. 3 shows a method for proactively managing horizontal scaling of a node in accordance with one or more embodiments of the invention.

FIG. 3 shows a method for proactively managing horizontal scaling of a node in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3, the method shown in FIG. 3 may be executed by, for example, the above-discussed preference module (e.g., 200, FIG. 2). Other components of the system (100) illustrated in FIG. 1 may also execute all or part of the method shown in FIG. 3 without departing from the scope of the invention.

In Step 300, the preference module (more specifically, the network monitoring agent (e.g., 210, FIG. 2)) receives a horizontal scaling request for the source node (e.g., 130, FIG. 1) from a requesting entity. In one or more embodiments, the requesting entity may send the request because of a recent surge in network traffic, which is triggered due to a recently launched mobile phone.

In Step 302, in response to the horizontal scaling request (received in Step 300), the preference module (more specifically, the network monitoring agent) identifies app. data being used by one or more REST APIs. In one or more embodiments, the network monitoring agent may identify the app. data that is being used by the REST APIs based on a dataset obtained by itself. The network monitoring agent may then store (temporarily or permanently) the dataset in the storage/memory resources of the source node. Details of the network monitoring agent, dataset, and storage/memory resources are described above in reference to FIGS. 2 and 1, respectively.

In Step 304, the preference module (more specifically, the tagging engine (e.g., 220, FIG. 2)) tags the app. data (identified in Step 302) based on its usage level by the REST APIs (and based on other parameters available in the dataset). In one or more embodiments, before tagging the app. data, the tagging engine may make an API call to the storage/memory resources of the source node to obtain the dataset. Based on receiving the API call from the tagging engine, the storage/memory resources may allow the tagging engine to obtain the dataset. Separately, in one or more embodiments, upon receiving the dataset from the network monitoring agent, the storage/memory resources may send the dataset to the tagging engine. One of ordinary skill will appreciate that the tagging engine may obtain (or receive) the dataset by other means without departing from the scope of the invention.

After obtaining (or receiving) the dataset, the tagging engine may tag the app. data as important (e.g., important, highly important, etc.) or not important (e.g., less important, least important, etc.). For example, consider a scenario where app. data X is used, by REST API R, 27 times in 1 minute. In this scenario, the tagging engine may determine that the usage level of app. data X is (i) above the predetermined minimum usage level threshold (e.g., 15 times in 1 minute) and (ii) below the predetermined normal usage level threshold (e.g., 40 times in 1 minute). In this manner, based on the configuration instructions, the tagging engine may tag app. data X as "less important", which is "not important". Details of the tagging process and configuration instructions are described above in reference to FIG. 2.

In Step 306, the preference module (more specifically, the prediction module (e.g., 230, FIG. 2)) obtains a predicted probability of usage level of the tagged app. data (tagged in Step 304). In one or more embodiments, before obtaining the predicted probability of usage level of the tagged app. data, the prediction module may make an API call to the storage/memory resources of the source node to obtain the tagging information of the app. data. Based on receiving the API call from the prediction module, the storage/memory resources may allow the prediction module to obtain the tagging information of the app. data. Separately, in one or more embodiments, upon receiving the tagging information of the app. data, the storage/memory resources may send the tagging information of the app. data to the prediction module. One of ordinary skill will appreciate that the prediction module may obtain (or receive) the tagging information of the app. data by other means without departing from the scope of the invention.

After obtaining (or receiving) the tagging information of the app. data (or after obtaining the latest dataset from the network monitoring agent), the prediction module may execute the MCP model to obtain the predicted probability of usage level of the tagged app. data as, for example, high or low. For example, if "important" tagged app. data will be used by the source node in near-future, the MCP model may determine the predicted probability of usage level of that app. data as "high". As yet another example, if "not important" (e.g., not critical) tagged app. data will not be used by the source node in near-future, the MCP model may determine the predicted probability of usage level of that app. data as "low". Details of obtaining the predicted probability of usage level are described above in reference to FIG. 2.

In Step 308, a first determination is made as to whether the tag of the app. data is "important" and the predicted probability of usage level of the app. data is "low". Accordingly, in one or more embodiments, if the result of the determination is YES, the method proceeds to Step 316. If the result of the determination is NO, the method alternatively proceeds to Step 310.

In Step 310, as a result of the first determination in Step 308 being NO, a second determination is made as to whether the tag of the app. data is "important" and the predicted probability of usage level of the app. data is "high". Accordingly, in one or more embodiments, if the result of the second determination is YES, the method proceeds to Step 312. If the result of the second determination is NO, the method alternatively proceeds to Step 314.

In Step 312, as a result of the second determination in Step 310 being YES, the preference module (more specifically, the replication module (e.g., 240, FIG. 2)) retains the tagged app. data in the source node. In this manner, the requesting entity of the source node may not experience performance degradation in production workloads, because (i) the replication process of the app. data that will be "in use" in near-future may take hours (depending on the size of the data) and (ii) the replication process may use limited computing resources of the source node.

Thereafter, the replication module may notify, via the GUI of the source node, the requesting entity about the failure of the horizontal scaling.

In one or more embodiments, the method may end following Step 312.

In Step 314, as a result of the second determination in Step 310 being NO, a third determination is made as to whether the tag of the app. data is "not important" and the predicted probability of usage level of the app. data is "low". Accordingly, in one or more embodiments, if the result of the third determination is YES, the method proceeds to Step 316. If the result of the third determination is NO, the method alternatively returns to Step 312.

In Step 316, as a result of the first determination in Step 308 being YES, and as a result of the third determination in Step 314 being YES, the preference module (more specifically, the replication module) replicates the tagged app. data from the source node to a target node (e.g., 150, FIG. 1). Details of the replication process are described above in reference to FIG. 2.

In Step 318, the preference module (more specifically, the replication module) notifies, via the GUI of the source node, the requesting entity about the completion of the horizontal scaling.

In one or more embodiments, the method may end following Step 318.

The embodiments shown in FIG. 3 first infer the app. data (e.g., which REST APIs are interacting with the app. data, which REST APIs are interdependent, etc.) and then create a context (e.g., which app. data is important, which app. data is not important, which app. data will be used in near-future, which app. data will not be used in near-future, etc.) based on the inferred data. Thereafter, based on the context, the embodiments execute the horizontal scaling of the source node and replication of the app. data that will not be used in the near-future. With this way: (i) the horizontal scaling of the source node will be completed within a short period of time (because not every app. data will be replicated to the target node), (ii) the target node will be fully functional within a short period of time, (iii) the services on the target node (and the target node itself) will be completely stateful, (iv) the administrator of the source node will not experience any performance degradation in the production workloads because of the replication process, and (v) enterprises may not lose any user because of long website response times.

Start of Example

Figure 41:
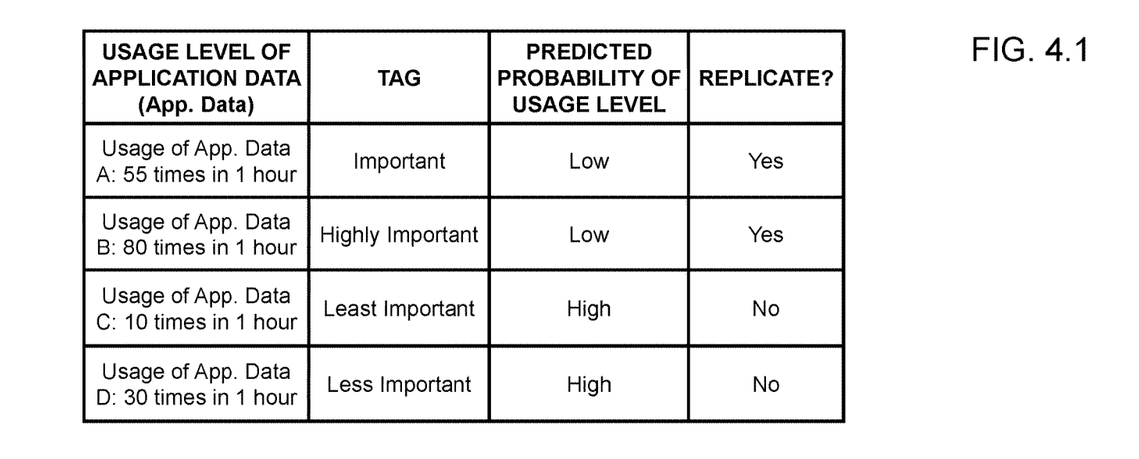
Figure 42:
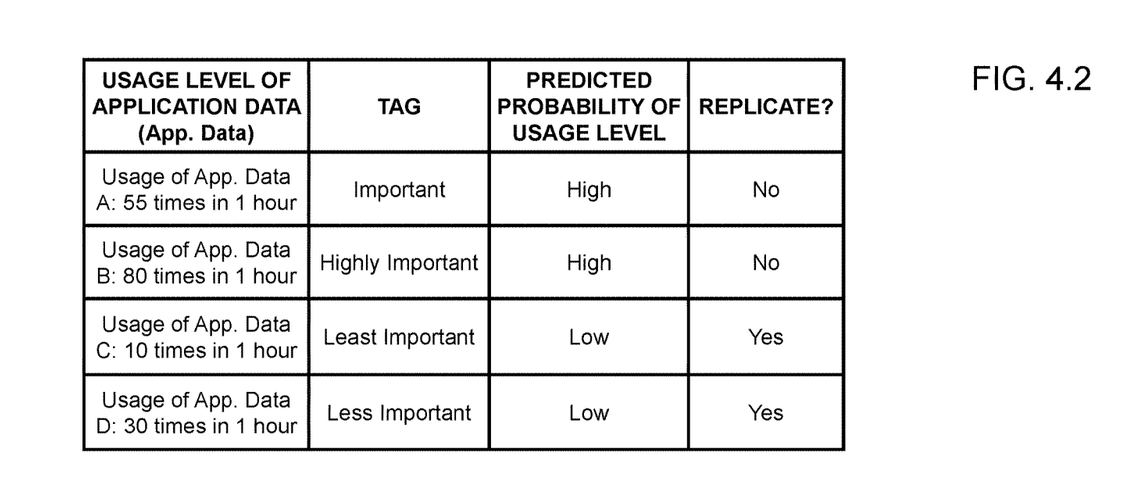

The following section describes an example of one or more embodiments. The example, illustrated in FIGS. 4.1 and 4.2, is not intended to limit the scope of the embodiments disclosed herein and is independent from any other examples discussed in this application.

Turning now to FIG. 4.1, FIG. 4.1 shows a scenario in which upon receiving a horizontal scaling request for a source node from a requesting entity, the preference module identifies the app. data (App. Data A, App. Data B, App. Data C, and App. Data D) of the source node that are being used by one or more REST APIs. For the sake of brevity, not all processes performed by the preference module may be discussed in FIG. 4.1.

Assume here that: (i) usage level of App. Data A, by REST API X, is 55 times in 1 hour, (ii) usage level of App. Data B, by REST API X, is 80 times in 1 hour, (iii) usage level of App. Data C, by REST API X, is 10 times in 1 hour, and (iv) usage level of App. Data D, by REST API X, is 30 times in 1 hour. After obtaining a dataset corresponding to these app. data, the preference module tags: (i) App. Data A as "important" because the usage level of App. Data A is above the predetermined normal usage level threshold (40 times in 1 hour) and below the predetermined maximum usage level threshold (70 times in 1 hour), (ii) App. Data B as "highly important" because the usage level of App. Data B is above the predetermined maximum usage level threshold, (iii) App. Data C as "least important" because the usage level of App. Data C is below the predetermined minimum usage level threshold (15 times in 1 hour), and (iv) App. Data D as "less important" because the usage level of App. Data D is above the predetermined minimum usage level threshold and below the predetermined normal usage level threshold.

The preference module then executes the MCP model and obtains a predicted probability of usage level of: (i) "low" for App. Data A, (ii) "low" for App. Data B, (iii) "high" for App. Data C, and (iv) "high" for App. Data D. Thereafter, based on the tagging information and predicted probability usage level of each app. data, the preference module determines that: (i) App. Data A can be replicated from the source node to a target node, (ii) App. Data B can be replicated from the source node to the target node, (iii) App. Data C should not be replicated from the source node to the target node, and (iv) App. Data D should not be replicated from the source node to the target node.

Based on the above determinations, the preference module replicates App. Data A and App. Data B to the target node, and retains App. Data C and App. Data D in the source node. Thereafter, the preference module notifies the requesting entity about the completion of the horizontal scaling.

Turning now to FIG. 4.2, FIG. 4.2 shows a second scenario in which upon receiving a second horizontal scaling request for the source node from the requesting entity, the preference module identifies the app. data (App. Data A, App. Data B, App. Data C, and App. Data D) of the source node that are being used by one or more REST APIs. Comparing to the scenario discussed above in reference to FIG. 4.1, the second scenario is related to a recent surge in network traffic because of a recently launched mobile phone. For the sake of brevity, not all processes performed by the preference module may be discussed in FIG. 4.2.

Assume here that: (i) usage level of App. Data A, by REST API X, is 55 times in 1 hour, (ii) usage level of App. Data B, by REST API X, is 80 times in 1 hour, (iii) usage level of App. Data C, by REST API X, is 10 times in 1 hour, and (iv) usage level of App. Data D, by REST API X, is 30 times in 1 hour. After obtaining a dataset corresponding to these app. data, the preference module tags: (i) App. Data A as "important" because the usage level of App. Data A is above the predetermined normal usage level threshold (40 times in 1 hour) and below the predetermined maximum usage level threshold (70 times in 1 hour), (ii) App. Data B as "highly important" because the usage level of App. Data B is above the predetermined maximum usage level threshold, (iii) App. Data C as "least important" because the usage level of App. Data C is below the predetermined minimum usage level threshold (15 times in 1 hour), and (iv) App. Data D as "less important" because the usage level of App. Data D is above the predetermined minimum usage level threshold and below the predetermined normal usage level threshold.

The preference module then executes the MCP model and obtains a predicted probability of usage level of: (i) "high" for App. Data A (because of the recent surge in the network traffic), (ii) "high" for App. Data B (because of the recent surge in the network traffic), (iii) "low" for App. Data C, and (iv) "low" for App. Data D. Thereafter, based on the tagging information and predicted probability usage level of each app. data, the preference module determines that: (i) App. Data A should not be replicated from the source node to the target node, (ii) App. Data B should not be replicated from the source node to the target node, (iii) App. Data C can be replicated from the source node to the target node, and (iv) App. Data D can be replicated from the source node to the target node.

Based on the above determinations, the preference module replicates App. Data C and App. Data D to the target node, and retains App. Data A and App. Data B in the source node. Thereafter, the preference module notifies the requesting entity about the completion of the horizontal scaling.

End of Example

Turning now to FIG. 5, FIG. 5 shows a diagram of a computing device in accordance with one or more embodiments of the invention.

In one or more embodiments of the invention, the computing device (500) may include one or more computer processors (512), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data replication, the method comprising:
    identifying data being used by an application programming interface (API), wherein the data is stored in a source device,
        wherein the data comprises at least an identifier of an application, an error related to the application, a version of the application, a display resolution configuration of the source device, and a type of an operating system executing on the source device;
    tagging the data based on a usage level of the data by the API;
    obtaining a predicted probability of the usage level of the data;
    making a first determination that the data is tagged as important data and the predicted probability of the usage level of the data is low; and
    replicating, based on the first determination, the data from the source device to a target device, wherein the target device is added to a system hosting the source device and the target device to horizontally scale the source device for overcoming a surge in network traffic.

2. The method of claim 1, further comprising:
    identifying second data being used by a second API, wherein the second data is stored in the source device;
    tagging the second data based on a usage level of the second data by the second API;
    obtaining a predicted probability of the usage level of the second data;
    making a second determination that the second data is tagged as important data and the predicted probability of the usage level of the second data is high; and
    retaining, based on the second determination, the second data in the source device.

3. The method of claim 1, further comprising:
    identifying second data being used by a second API, wherein the second data is stored in the source device;
    tagging the second data based on a usage level of the second data by the second API;
    obtaining a predicted probability of the usage level of the second data;
    making a second determination that the second data is tagged as not important data and the predicted probability of the usage level of the data is low; and
    replicating, based on the second determination, the second data from the source device to the target device.

4. The method of claim 1, further comprising:
    identifying second data being used by a second API, wherein the second data is stored in the source device;
    tagging the second data based on a usage level of the second data by the second API;
    obtaining a predicted probability of the usage level of the second data;
    making a second determination that the second data is tagged as not important data and the predicted probability of the usage level of the data is high; and
    retaining, based on the second determination, the second data in the source device.

5. The method of claim 1, wherein the API is a representational state transfer (REST) API.

6. The method of claim 1, wherein the predicted probability of the usage level of the data is determined using a conformal prediction model.

7. The method of claim 1, wherein the usage level of the data specifies an amount of access to the data within a predetermined period of time.

8. A non-transitory computer readable medium comprising computer readable program code, which when executed by a computer processor enables the computer processor to perform a method for managing data replication, the method comprising:
    identifying data being used by an application programming interface (API), wherein the data is stored in a source device,
        wherein the data comprises at least an identifier of an application, an error related to the application, a version of the application, a display resolution configuration of the source device, and a type of an operating system executing on the source device;
    tagging the data based on a usage level of the data by the API;
    obtaining a predicted probability of the usage level of the data;
    making a first determination that the data is tagged as important data and the predicted probability of the usage level of the data is low; and
    replicating, based on the first determination, the data from the source device to a target device, wherein the target device is added to a system hosting the source device and the target device to horizontally scale the source device for overcoming a surge in network traffic.

9. The non-transitory computer readable medium of claim 8, wherein the method further comprising:
    identifying second data being used by a second API, wherein the second data is stored in the source device;

tagging the second data based on a usage level of the second data by the second API;
obtaining a predicted probability of the usage level of the second data;
making a second determination that the second data is tagged as important data and the predicted probability of the usage level of the second data is high; and
retaining, based on the second determination, the second data in the source device.

10. The non-transitory computer readable medium of claim 8, wherein the method further comprising:
identifying second data being used by a second API, wherein the second data is stored in the source device;
tagging the second data based on a usage level of the second data by the second API;
obtaining a predicted probability of the usage level of the second data;
making a second determination that the second data is tagged as not important data and the predicted probability of the usage level of the data is low; and
replicating, based on the second determination, the second data from the source device to the target device.

11. The non-transitory computer readable medium of claim 8, wherein the method further comprising:
identifying second data being used by a second API, wherein the second data is stored in the source device;
tagging the second data based on a usage level of the second data by the second API;
obtaining a predicted probability of the usage level of the second data;
making a second determination that the second data is tagged as not important data and the predicted probability of the usage level of the data is high; and
retaining, based on the second determination, the second data in the source device.

12. The non-transitory computer readable medium of claim 8, wherein the API is a representational state transfer (REST) API.

13. The non-transitory computer readable medium of claim 12, wherein the predicted probability of the usage level of the data is determined using a conformal prediction model.

14. The non-transitory computer readable medium of claim 12, wherein the usage level of the data specifies an amount of access to the data within a predetermined period of time.

15. A system for managing data replication, the system comprising:
a processor comprising circuitry;
memory comprising instructions, which when executed perform a method, the method comprising:
identifying data being used by an application programming interface (API), wherein the data is stored in a source device, wherein the API is a representational state transfer (REST) API,
wherein the data comprises at least an identifier of an application, an error related to the application, a version of the application, a display resolution configuration of the source device, and a type of an operating system executing on the source device;
tagging the data based on a usage level of the data by the API;
obtaining a predicted probability of the usage level of the data;
making a first determination that the data is tagged as important data and the predicted probability of the usage level of the data is low; and
replicating, based on the first determination, the data from the source device to a target device, wherein the target device is added to a system hosting the source device and the target device to horizontally scale the source device for overcoming a surge in network traffic.

16. The system of claim 15, wherein the method further comprising:
identifying second data being used by a second API, wherein the second data is stored in the source device;
tagging the second data based on a usage level of the second data by the second API;
obtaining a predicted probability of the usage level of the second data;
making a second determination that the second data is tagged as important data and the predicted probability of the usage level of the second data is high; and
retaining, based on the second determination, the second data in the source device.

17. The system of claim 15, wherein the method further comprising:
identifying second data being used by a second API, wherein the second data is stored in the source device;
tagging the second data based on a usage level of the second data by the second API;
obtaining a predicted probability of the usage level of the second data;
making a second determination that the second data is tagged as not important data and the predicted probability of the usage level of the data is low; and
replicating, based on the second determination, the second data from the source device to the target device.

18. The system of claim 15, wherein the method further comprising:
identifying second data being used by a second API, wherein the second data is stored in the source device;
tagging the second data based on a usage level of the second data by the second API;
obtaining a predicted probability of the usage level of the second data;
making a second determination that the second data is tagged as not important data and the predicted probability of the usage level of the data is high; and
retaining, based on the second determination, the second data in the source device.

19. The system of claim 18, wherein the predicted probability of the usage level of the data is determined using a conformal prediction model.

20. The system of claim 19, wherein the usage level of the data specifies an amount of access to the data within a predetermined period of time.

* * * * *